US008315627B2

(12) United States Patent
Pöyhönen et al.

(10) Patent No.: US 8,315,627 B2
(45) Date of Patent: Nov. 20, 2012

(54) PRO-ACTIVE ACCESS HANDLING IN A MULTI-ACCESS NETWORK ENVIRONMENT

(75) Inventors: Petteri Pöyhönen, Helsinki (FI); Ove Strandberg, Lappböle (FI)

(73) Assignee: Nokia Corporation, Espoo (FI)

( * ) Notice: Subject to any disclaimer, the term of this patent is extended or adjusted under 35 U.S.C. 154(b) by 1549 days.

(21) Appl. No.: 11/372,038

(22) Filed: Mar. 10, 2006

(65) Prior Publication Data

US 2007/0087745 A1    Apr. 19, 2007

(30) Foreign Application Priority Data

Oct. 13, 2005    (EP) .................................. 05022367

(51) Int. Cl.
*H04Q 7/20*    (2006.01)
(52) U.S. Cl. ................. 455/436; 455/439; 455/552.1; 370/331
(58) Field of Classification Search ............ 370/338, 370/331; 455/436, 439, 552.1
See application file for complete search history.

(56) References Cited

U.S. PATENT DOCUMENTS

| 2003/0092444 A1* | 5/2003 | Sengodan et al. ............ 455/436 |
| 2004/0053632 A1* | 3/2004 | Nikkelen et al. ............. 455/522 |
| 2004/0137901 A1 | 7/2004 | Hamasaki et al. |
| 2005/0111409 A1 | 5/2005 | Spear et al. |
| 2007/0110009 A1* | 5/2007 | Bachmann et al. .......... 370/338 |

FOREIGN PATENT DOCUMENTS

| EP | 1531645 | 5/2005 |
| WO | WO 2005/032170 | 4/2005 |

OTHER PUBLICATIONS

International Search Report for International Application No. PCT/IB2006/053645, filed Oct. 5, 2006.
M. Cappiello, et al.—University of Rome; CoRiTeL-Telecommunication Research Institute, "Mobility amongst Heterogeneous Networks with AAA Support"; pp. 2064-2069, Apr. 2002.
3GPP—TR 23.913 v 1.0.0, "$3^{rd}$ Generation Partnership Project (3GPP); Technical Specification Group (TSG) CN; Universal Mobile Telecommunications System (UMTS); Turbo-Charger", pp. 1-21, Dec. 1999.
3GPP—TS 23.119 v6.0.0, $3^{rd}$ Generation Partnership Project (3GPP); Technical Specification Group Core Network; Gateway Location Register (GLR); Stage 2 (Release 6), pp. 1-124, Dec. 2004.

* cited by examiner

*Primary Examiner* — Danh Le
(74) *Attorney, Agent, or Firm* — Harrington & Smith

(57) ABSTRACT

Providing access for a mobile node to a communication network comprising multiple access networks operating according to different access technologies, wherein said communication network is configured to communicate by means of different access technologies with said mobile node, comprising, upon an access request of the mobile node at a first access network, preparing the access networks, other than the first one, for providing access for the mobile node in case of a handover of the mobile node to one of these other access networks.

68 Claims, 8 Drawing Sheets

PRO-ACTIVE ACCESS HANDLING IN A MULTI-ACCESS NETWORK ENVIRONMENT

FIELD OF THE INVENTION

The present invention relates to a pro-active access handling in a multi-access network environment. In particular, the present invention relates to providing access for a mobile and/or roaming node to a communication network, e.g. a visited communication network, comprising multiple access networks operating according to different access technologies.

BACKGROUND OF THE INVENTION

Previously, the development of communication systems included all parts of the respective system such as a core network part, an access network part etc. This has for example been the case for second generation (mobile) communication systems such as GSM (Global System for Mobile Communications).

However, in recent years, the development of new communication systems as well as the further development of existing communication systems tends to be of rather heterogeneous nature. That is, the development of the single parts of a communication system has drifted apart from each other, thus nowadays being independent of each other. Furthermore, there have been developed many co-existing technologies underlying the single parts and the whole of a communication system. This has for example been the case for third generation (mobile) communication systems such as UMTS (Universal Mobile Telecommunications System).

Consequently, there have recently emerged communication systems, for example mobile communication systems, having a heterogeneous multi-access environment. Stated in other words, such systems comprise multiple access networks each operating according to an individual access technology, such as WCDMA, cdma2000, GPRS etc. (CDMA: code division multiple access).

Generally, in communication systems enabling mobility, i.e. mobile communication systems, there is a necessity that a roaming user or node gets access to a visited communication network (i.e. a communication network other than its home network). In a communication system with multiple access networks or technologies, the access can be provided by any one of the access networks or technologies as long as the roaming user or node is able to operate according to this network or technology.

However, in such a scenario there exists a problem when a roaming user or node arrives at a new visited network for the first time. If so, it may take a relatively long time before the visited network is able to grant access to the user or node, because it needs to contact the user's home network or subscription provider before being bale to decide whether the user is entitled to get an access or not. Furthermore, there exists a problem when a user or node already having access at one access network hands over to another access network or technology within the same visited network (i.e. of the same visited network operator). Another problem may even exist when the user or node hands over from one access network to another access network within the same access technology and visited network operator. In all of these cases, the required handover procedure and the associated signaling according to conventional approaches take some time which then affects the user experience in terms of connectivity and service break.

Hitherto, there has been proposed no solution to these problems linked with multi-access environments. Rather, previously known solutions, such as those defined by the Third Generation Partnership Project 3GPP, only address a similar problem and focus on a 3G (third generation according to the) mobile cellular network environment, i.e. aiming to decrease the signaling delay. Examples for such conventional approaches may include the so-called Turbo Charger approach as e.g. defined in the document "3GPP-TR 23.913 V1.0.0 (1999-12)" and the so-called Gateway Location Register approach as e.g. defined in the document "3GPP-TS 23.119 V6.0.0 (2004-12)".

These approaches more particularly relate to subscription handling related signaling optimization between network boundaries, and have several drawbacks. The Turbo Charger approach for example, among others, is only applicable for UMTS networks, limits the number of subscribers registered in a network, and introduces additional complexity to the network architecture in terms of additional network elements required and their operation.

Also, since the approaches mentioned above are aimed for 3G cellular networks having a homogenous access environment, they are not applicable in generic heterogeneous multi-access environments and thus not sufficient to solve the problems described above in connection with such multi-access environments.

Thus, a solution to the above problems and drawbacks is needed particularly for multi-access network environments.

SUMMARY OF THE INVENTION

Consequently, it is an object of the present invention to remove the above drawbacks inherent to the prior art and to provide an accordingly improved method, network elements and network arrangement as well as computer program product.

According to a first aspect of the invention, there is a method comprising: providing access for a mobile node configured to communicate by different access technologies to a communication network comprising multiple access networks operating according to different access technologies, and upon an access request of the mobile node at a first access network authenticating the mobile node, irrespective of whether the mobile node is authenticated and whether the access request is granted, fetching preparation information related to the mobile node, and preparing the access networks other than the first access network to provide access for the mobile node in case of a handover of the mobile node to one of the other access networks, comprising distributing to these other access networks of the communication network the preparation information to prepare the other access networks, wherein the distributing is effected on the basis of smaller network areas into which the access networks are divided on the basis of current connectivity conditions, and wherein the distributing the preparation information is performed to a set of most probable network areas of the smaller network areas for a handover.

According to a second aspect of the invention, there is an apparatus comprising: an access element configured to provide access for a mobile node to a communication network, said communication network comprising multiple access networks operating according to different access technologies, wherein the apparatus is configured to communicate with said mobile node by a first access technology of a first access network, a processor configured upon receipt of an access request of the mobile node at a first access network to authenticate the mobile node, the processor configured, irrespective of whether the mobile node is authenticated and whether the access request is granted, to fetch preparation information related to the mobile node, the processor configured to prepare the access networks, other than the first one, to provide access for the mobile node in case of a handover of the mobile node to one of these other access networks, and a transmitter configured to distribute to these other access networks of the network the preparation information to prepare the other access networks, wherein the transmitter is configured to distribute the preparation information on the basis of smaller network areas into which the access networks are divided on the basis of current connectivity conditions, and wherein the transmitter is configured to distribute the preparation information to a set of most According to a third aspect of the invention, there is an apparatus comprising: an access element configured to provide access for a mobile node to a communication network, said communication network comprising multiple access networks operating according to different access technologies, wherein the apparatus is configured to communicate with said mobile node by an access technology other than that of the first access network, and a processor configured upon receipt of an access request of the mobile node at a first access network, to authenticate the mobile node, the processor configured, irrespective of whether the mobile node is authenticated and whether the access request is granted, to fetch preparation information related to the mobile node, the processor configured to prepare the access networks, other than the first one, to provide access for the mobile node in case of a handover of the mobile node to one of these other access networks, and a transmitter configured to distribute to these other access networks of the network the preparation information to prepare the other access networks, wherein the transmitter is configured to distribute on a basis of smaller network areas into which the access networks are divided on a basis of current connectivity conditions, and wherein the transmitter is configured to distribute the preparation information to a set of most probable network areas of the smaller network areas for a handover.

According to a fourth aspect of the invention, there is a network comprising a network arrangement of a communication network to provide access for a mobile node to the communication network comprising multiple access networks operating according to different access technologies, wherein said network arrangement is configured to: communicate with said mobile node by different access technologies, and upon receipt of an access request of the mobile node at a first access network to authenticate the mobile node, irrespective of whether the mobile node is authenticated and whether the access request is granted, to fetch preparation information related to the mobile node, to prepare the access networks other than the first access network to provide access for the mobile node in case of a handover of the mobile node to one of these other access networks, and the network arrangement further configured to distribute to the other access networks of the network the preparation information to prepare the other access networks, wherein the distributing is effected on a basis of smaller network areas into which the access networks are divided on a basis of current connectivity conditions, and wherein the distributing the preparation information is performed to a set of most probable network areas of the smaller network areas for a handover.

According to a fifth aspect of the invention, there is a computer program product, embodied on a non-transitory computer readable medium, being loadable into a memory of a digital processor of a network element in a communication network and comprising software code portions for performing, when said product is run on said digital processor there is performed at least the first aspect of the invention.

Further advantageous developments and favorable refinements are set out in the respective dependent claims.

It is an advantage of the present invention that an improved handover procedure with reduced signaling is provided in a multi-access environment. Thereby, a faster connectivity for roaming users in multi-access environments is realized.

At the same time, it is advantageous that optimized (i.e. faster) handover/response times between access technologies within the same operator are provided.

Similarly, it is advantageous that optimized (i.e. faster) handover/response times between access networks within the same access technology are provided.

Thereby, also overall access times during handovers between access technologies within the same operator as well as within the same operator and access technology are advantageously optimized, i.e. reduced.

With the embodiments of the present invention, the user's overall experience in terms of connectivity and service break is improved, thus providing a more seamless handover.

Furthermore, it is beneficial that the embodiments of the present invention are not (radio) access technology specific and can be deployed in different mobile cellular network architectures, such as for example future network developments usually termed 3.5G, 3.9G or 4G.

BRIEF DESCRIPTION OF THE DRAWINGS

In the following, the present invention will be described in greater detail with reference to the accompanying drawings, in which.

DETAILED DESCRIPTION OF EMBODIMENTS
OF THE PRESENT INVENTION

The present invention is described herein with reference to particular non-limiting examples. A person skilled in the art will appreciate that the invention is not limited to these examples, and may be more broadly applied.

In particular, the present invention is described in relation to a multi-access network architecture example implementation. As such, the description of the embodiments given herein specifically refers to terminology which is directly related to this example implementation. Such terminology is only used in the context of the presented examples, and does not limit the invention in any way.

Figure 1:
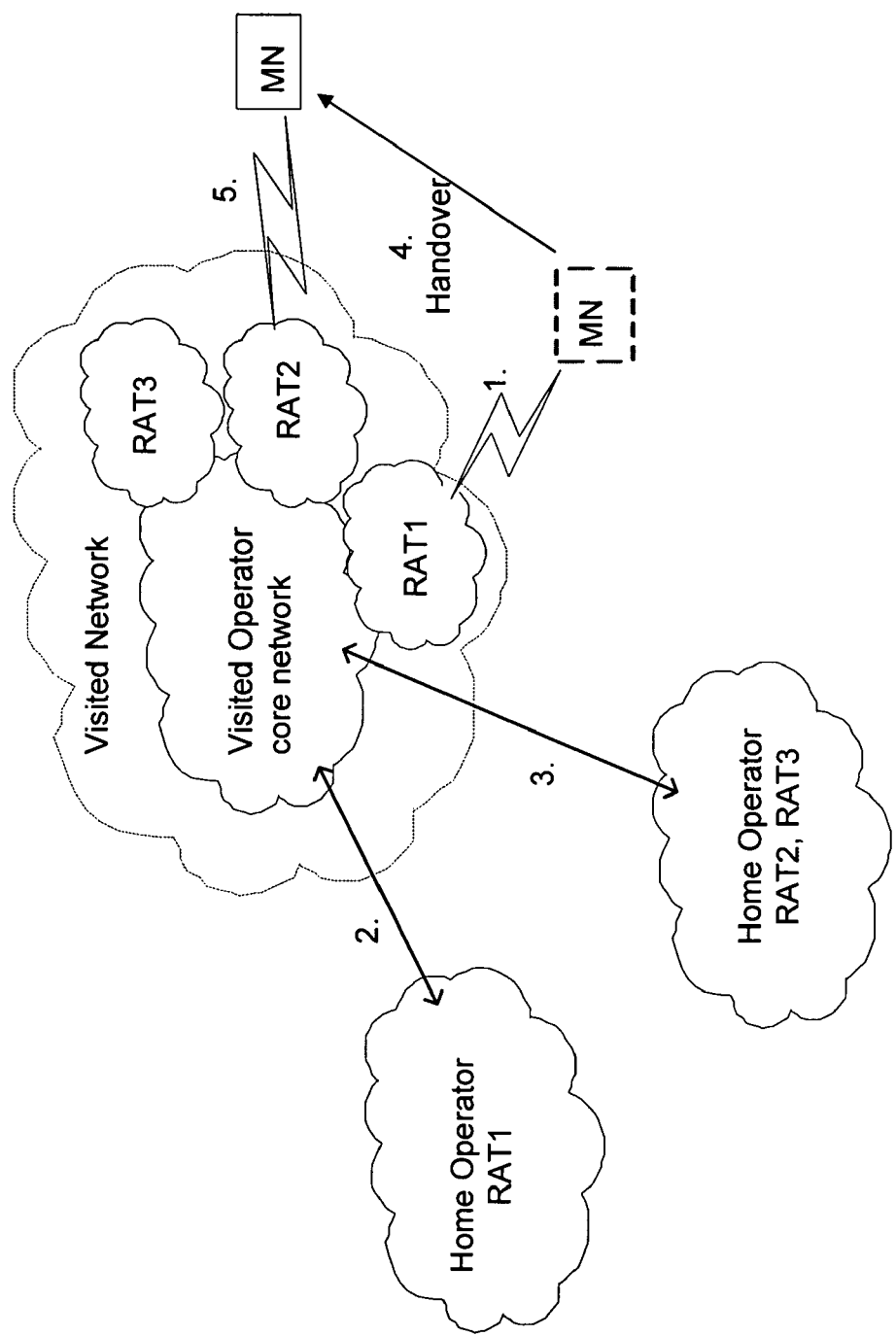
FIG. 1 shows a schematic diagram of a multi-access network environment illustrating a signaling process in case of an inter-RAT handover of a user according to an embodiment of the present invention.

FIG. 1 shows a schematic diagram of a multi-access network environment illustrating a signaling process in case of an inter-RAT handover of a user according to an embodiment of the present invention.

Figure 2:
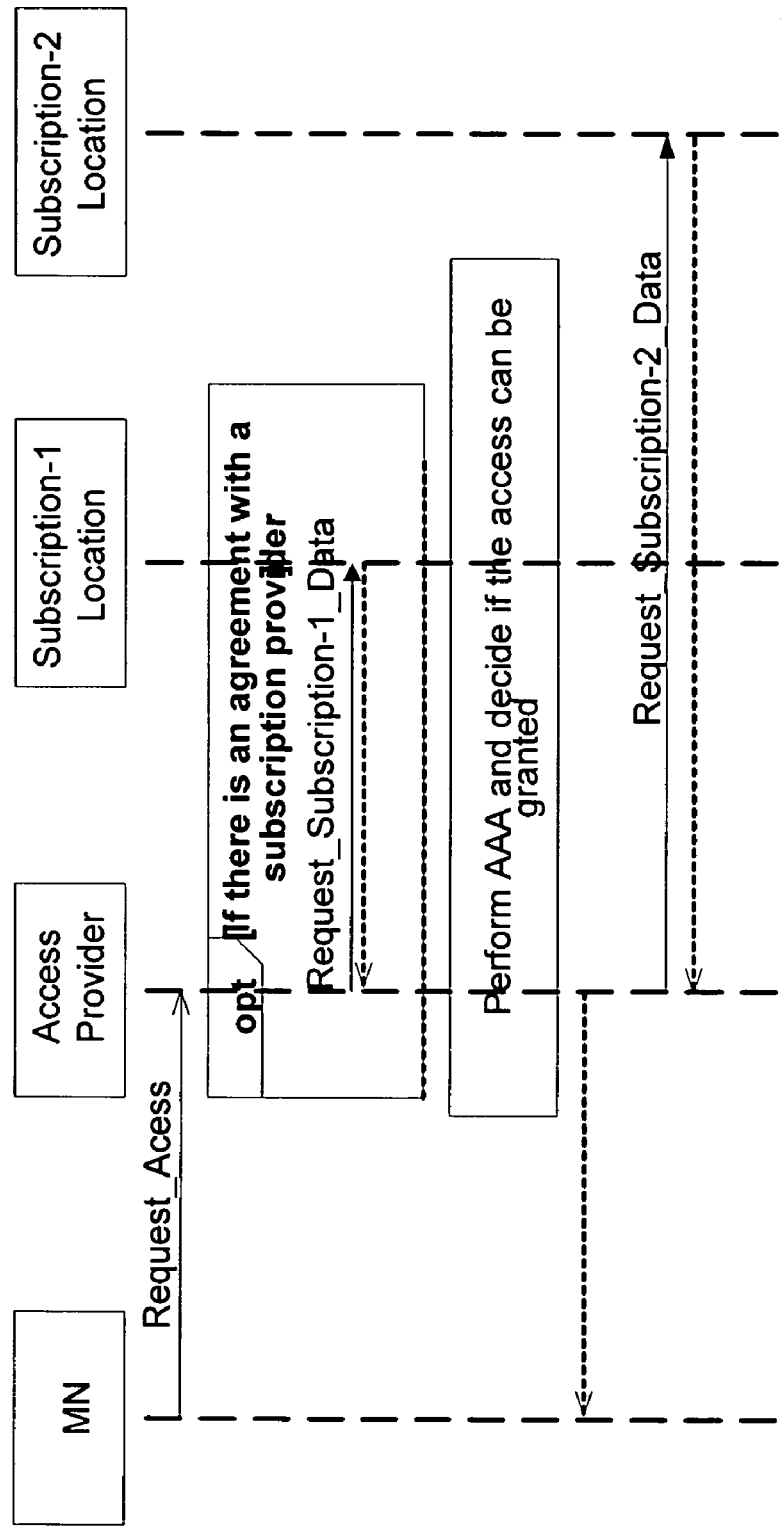
FIG. 2 shows a first example of a sequence chart illustrating a signaling procedure according to an embodiment of the present invention.

As will easily be evident from the below, the terms used in connection with FIG. 2 are meant to be of exemplary nature. This especially applies to the terms "access network", "visited network" and "home operator" and their relationship to more general terms such as "access provider", "subscription provider" and "agreement broker".

In the scenario as shown in FIG. 1, a visited network of a user or node MN (MN: mobile node) is illustrated by the collectivity of a visited operator core network and three access networks. It is assumed that each access network operates according to another radio access technology thus being denoted by RAT1, RAT2 and RAT3, respectively. Here, it is to be noted that radio access is used as an example in the following, while every kind of access technology is applicable in the present invention, such as e.g. infrared or optical technologies.

Additionally, there are illustrated two home operator networks handling subscriptions of the user or node MN. In the depicted example, one home operator network handles subscriptions relating to access network 1 with radio access technology RAT1, and the second home operator network handles subscription relating to access networks 2 and 3 with radio access technologies RAT2 and RAT3, respectively. Thereby, it is indicated by way of example that the roaming node MN has subscriptions which are handled by individual home operators each of which manages at least one subscription. These subscriptions of the roaming node MN (hereinafter representing a user) relate to different access technologies by means of which the roaming node MN is configured to communicate (in the present example RAT1, RAT2 and RAT3). Additionally, the subscriptions optionally also relate to the capabilities of the mobile nodes.

As will be evident from the subsequent description of the present example, major advantages of the present invention and its embodiments arise for mobile users or nodes roaming in visited networks and using multiple radio accesses depending on their communication needs. This is especially true for a case where a user has different subscription providers (i.e. home operators) for involved access technologies in which case it has typically been a relatively slow process to make a handover between the access networks and/or technologies involved. This is due to the fact that a visited network needs to perform certain functions before it can grant access for a user. These functions are for example authentication of a user and a preparation of charging. To be able to execute these functions it is required that user's subscription data is queried from user's home network(s) and this takes some time which then conventionally affects on user experience in means of connectivity and service break.

As can be gathered from FIG. 1, it is assumed that user has three different access technologies supported by his/her mobile node MN and that the user has attached and thus has connectivity to a visited network over RAT1 (cf. step 1). Then, the visited operator queries user's respective subscription data relating to RAT1 (and optionally representing the mobile node's capabilities) from user's respective home operator (for RAT1) (cf. step 2). Once the user is authenticated and the other necessary functions mentioned above are performed, the visited operator (i.e. the visited operator core network) grants access for the user via the access network with access technology RAT1. It is assumed hereby that the visited operator and the respective home operator (for RAT1) have a roaming agreement.

From an implementation's point of view, the above query of subscription data is conducted by means of at least one identity. Typically users have RAT-specific subscriptions and in these cases, the visited operator needs to know all other user's RAT subscriptions or subscription IDs to be able to contact related home operators to query respective data. In some cases, it might be that a set of different RATs are associated with a single "super ID" and in these cases, the visited operator needs to know this "user ID" because it acts as a key to access all user's subscription data.

For example, the user may include his/her respective identity for RAT1 in an access request message sent to the access network 1 when trying to get access thereto. Then, the visited operator can use this identity for querying respective subscription data from the respective home operator of the user. In this way, each of user's subscription relating to the individual access technologies (and optionally representing the mobile node's capabilities) may have its own identity, or the user may have a generic identity called "super ID" below, which can be used with all user's home networks/operators to access and query his/her subscription data relating to any access technologies (and optionally representing the mobile node's capabilities) configured for the user.

Accordingly, an embodiment of the present invention comprises a determination of the individual identities of the user's subscriptions for the purpose that the visited operator gets to know either user's other RAT subscriptions (or subscription identities). Such a determination is for example conducted by means of a standalone procedure between the roaming node and the visited network, or by means of a framework on the basis of a domain name system (DNS) lookup procedure, or by means of a framework on the basis of a 3G international mobile subscriber identity (IMSI) lookup procedure.

Once the visited operator knows either user's other RAT subscriptions or his/her "super ID", it is able to contact the respective home operator (for RAT2 and RAT3) and to query user's respective subscription data for the other access technologies, i.e. RAT2 and RAT3 (cf. step 3). Also, as can be seen below in more detail, subscription providers (e.g. home operators) must be known by the visited operator in order to be able to contact them. According to the present invention, this is done in a pro-active manner, i.e. prior to being required.

Now when and if the user prefers to change his/her access to RAT2, once the user makes a handover from RAT1 to RAT2 (cf. step 4), the visited network does not need to fetch user's subscription data for RAT2, because it already has it available locally. With this locally available information, the visited network is able to provide access for the roaming user via the second access network (cf. step 5).

Therefore, external signaling is decreased. In practice, this means that a local network is able to faster finish mandatory functions to decide whether it is allowed to grant access to a roaming user or not. This way the visited operator is able to make a faster decision whether it grants access to the roaming node or not, and thus the connectivity/service downtime during handover is reduced.

Stated in other words, there is presented a method for providing access for a mobile and/or roaming node to a (visited) communication network comprising multiple access networks operating according to different access technologies, wherein said mobile/roaming node is configured to communicate by means of different access technologies, said method comprising, upon an access request of the mobile/ roaming node at a first access network, a step of preparing (arranging) the access networks other than the first one for providing access for the mobile/roaming node in case of a handover of the mobile/roaming node to one of these other access networks. According to a variant, the method comprises, upon the access request of the mobile/roaming node at the first access network operating according to a first access technology, querying first subscription data of said node relating to the first access technology (and optionally representing the mobile node's capabilities); querying subscription data of said node relating to the others of its access technologies (and optionally representing the mobile node's capabilities); and providing access for said node via said first access network by means of said first subscription data. Further, the method may comprise, upon a handover of said node to a second access network operating according to a second access technology, providing access for said node via said second access network by means of those of said previously queried subscription data which relate to the second access technology.

As described above, the method could be embodied such that said communication network comprises subscription information relating to the different access technologies supported by said mobile node (and optionally representing the mobile node's capabilities), and wherein the step of preparing the other access networks is based on the subscriptions of the mobile node. Additionally, the step of preparing the other access networks can also be based on the capabilities of the mobile node.

The thus presented method is also adapted to the following case: The mobile node MN may perform a kind of "indirect" handover as well. For example, an operator 1 provides radio access technologies RAT1 and RAT2 and an operator 2 provides a further radio access technology RAT3. When the MN is first attached to RAT1 of operator 1, it could perform a handover to a network of operator 2 (i.e. RAT3), but operator 1 should even in this case not delete MN's subscription data immediately. This is because when the MN performs another handover from operator 2 to radio access technology RAT2 of operator 1, operator 1 should advantageously still have valid subscription data of the MN. To this end, an additional additional caching feature is also involved in the above method in order to maintain previously queried subscription data in case of a handover of the mobile node to another access network.

Figure 3:
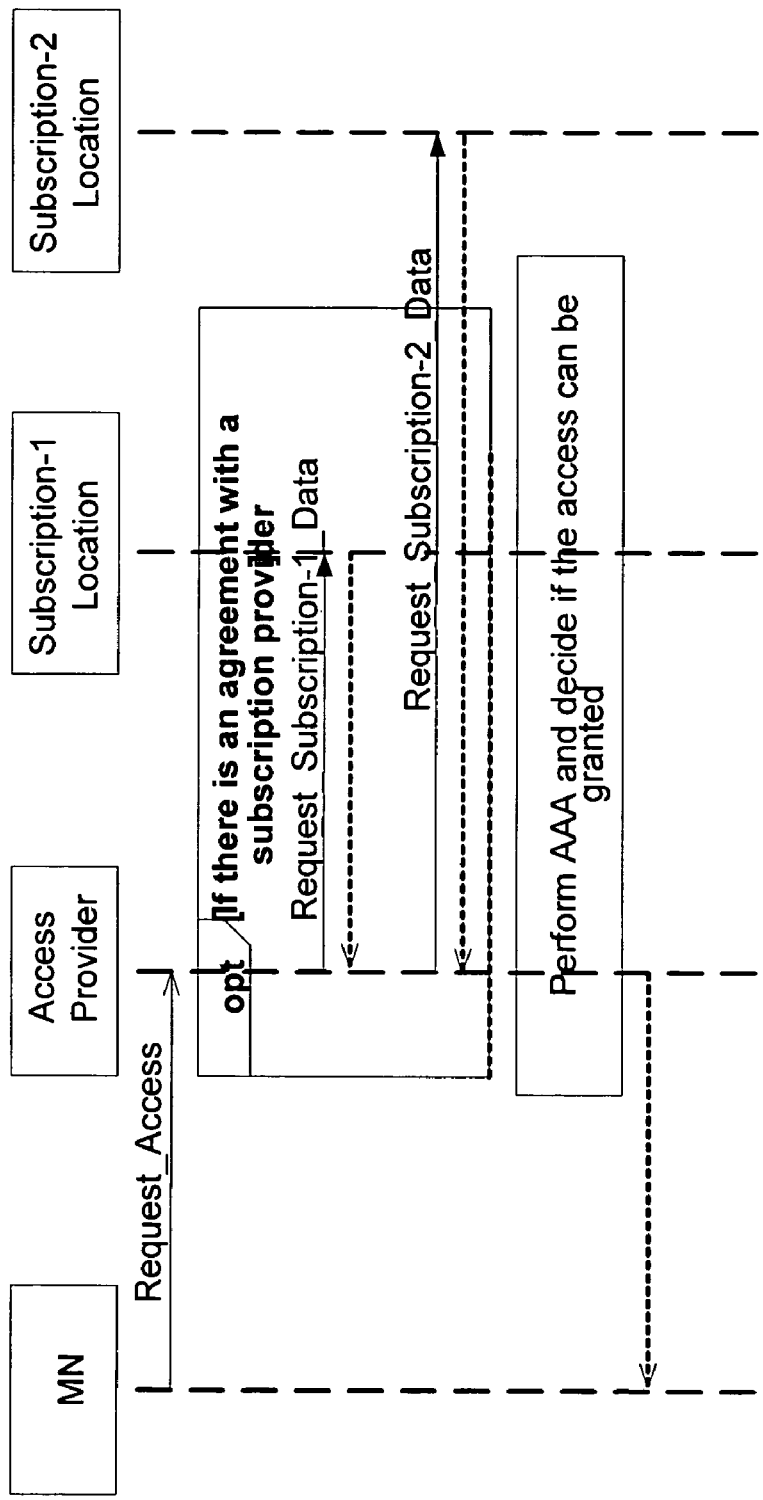
FIG. 3 shows a second example of a sequence chart illustrating a signaling procedure according to an embodiment of the present invention.
Figure 4:
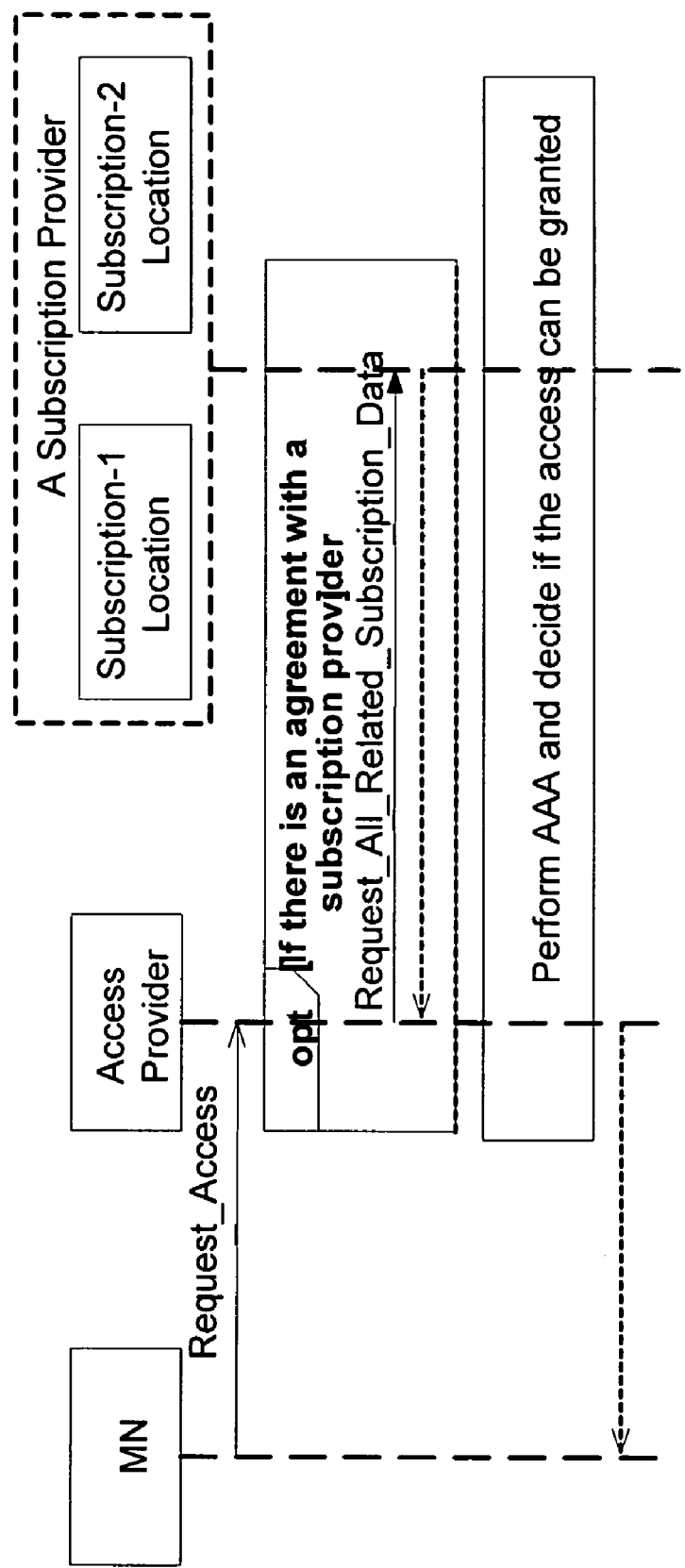
FIG. 4 shows a third example of a sequence chart illustrating a signaling procedure according to an embodiment of the present invention.

In the following, FIGS. 2 to 4 show three examples of sequence charts illustrating signaling procedures according to an embodiment of the present invention. These sequence charts relate to how extra subscription data is queried.

It is to be noted that subscription locations do not necessarily refer to the different subscription providers as mentioned beforehand. It might also be the case that from an access provider's point of view, there will be seen multi-RAT subscriptions. These could be implemented for example by using so-called agreement brokers as presented below.

FIG. 2 shows a first example of a sequence chart illustrating a signaling procedure according to an embodiment of the present invention.

Therein, an access provider requests additional subscription data after the processing of the access request of the mobile node MN has been finished. If the access has not been granted to the MN, it still might be beneficial to fetch other related subscription data for other supported RATs, because the MN may decide to try to request access for another RAT. Thus, the signaling procedure according to FIG. 2 is executed irrespective of the result of the access request processing at the access provider. The rest of the figure should be clear to a skilled person, why it should only be mentioned that AAA stands for authentication, authorization and accounting functionality.

FIG. 3 shows a second example of a sequence chart illustrating a signaling procedure according to an embodiment of the present invention.

The situation of FIG. 3 is similar to that of FIG. 2. Yet, an access provider requests additional subscription data before the access request processing has been finished.

FIG. 4 shows a third example of a sequence chart illustrating a signaling procedure according to an embodiment of the present invention.

In this figure, the same subscription provider manages different RAT-related subscription information and they can be requested during the same message exchange phase, i.e. all related subscription data can be requested at once, as can easily be gathered from FIG. 4.

Figure 5:
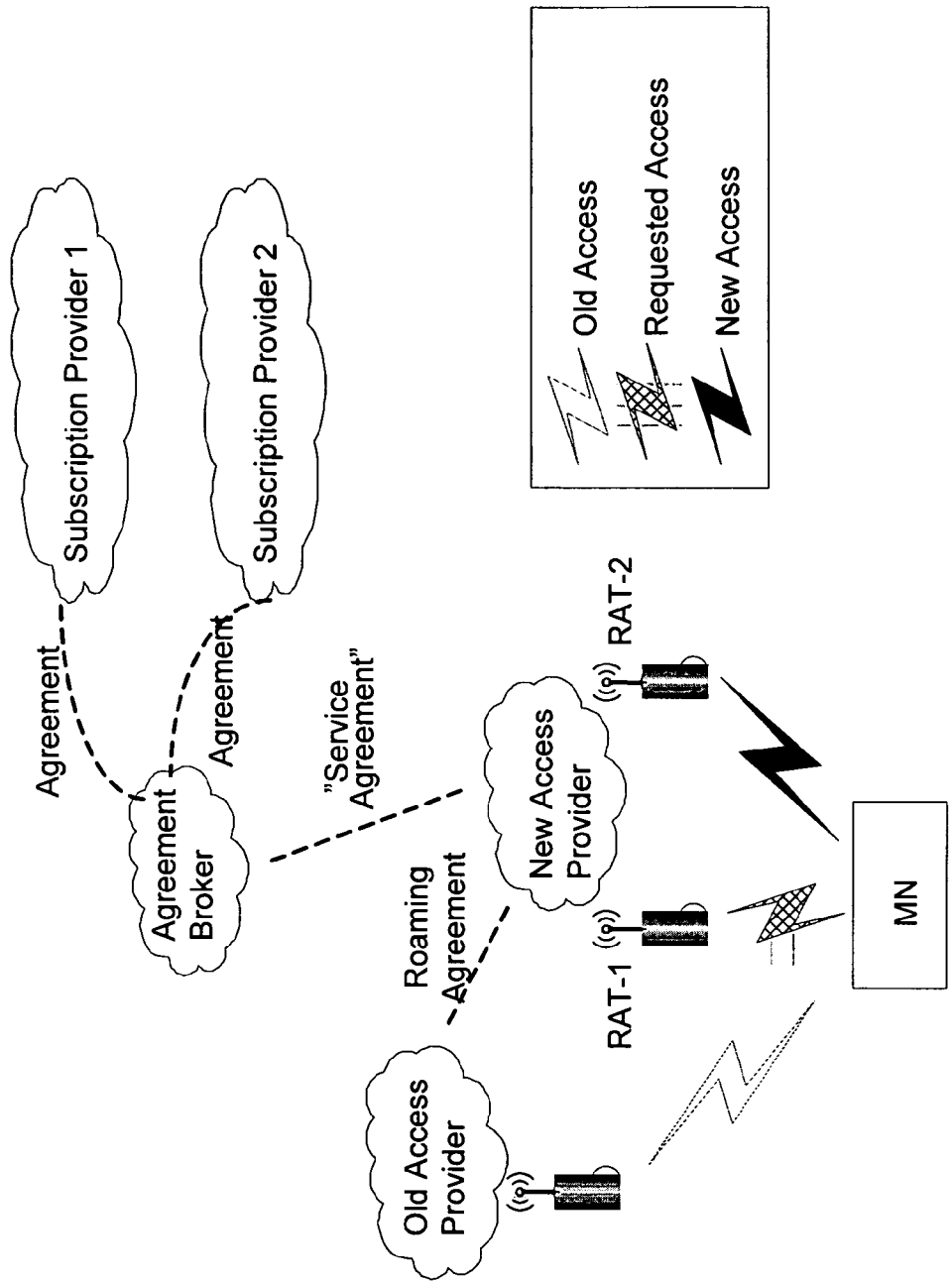
FIG. 5 shows a schematic diagram of a general network environment illustrating a roaming scenario according to an embodiment of the present invention.

FIG. 5 shows a schematic diagram of a general network environment illustrating a roaming scenario according to an embodiment of the present invention.

According to FIG. 5, a mobile node MN is roaming from an old access provider to a new access provider and is requesting access for access technology RAT-1. This is possible as the old and new access providers have a roaming agreement. The new access provider then contacts an agreement broker (as mentioned above) in order to fetch/query user's RAT-1-specific subscription data. After it has detected that the user (MN) may also use RAT-2 access technology, also RAT-2-specific subscription data is fetched/queried from the same agreement broker. This is based on a service agreement between the agreement broker and the new access provider. Thus, the agreement broker is seen as a subscription provider (also exemplarily referred to as home operator above) for the new access provider (also exemplarily referred to as visited network or access network above). Accordingly, it is transparent for the access provider how the agreement broker actually collects the requested subscription data. This collection can be done on the fly, i.e. the broker contacts related subscription providers and requests the respective data, or some subscription data could be locally stored in the broker's infrastructure.

Furthermore, it is possible that two access providers request the same subscription data in a pro-active manner as described above. Considering that access providers may cache subscription data for some time, it might be needed that a subscription provider tracks all access providers' pro-actively requested subscription data. This is due to the fact that, when the second access provider for example will use the requested subscription data, the first access provider needs to be notified about this in the case of pre-paid subscriptions because the data, which is previously fetched, is not up-to-date anymore. Before using that data, the first access provider needs to refresh it from the subscription provider in order to check whether there is still enough credit on the pre-paid subscription account.

Also, it is to be noted that the roles of the above-mentioned home operator and the above-mentioned visited network operator may change in a multi-access environment considering that RAT-specific subscriptions are in use. This case is illustrated in FIG. 6.

Figure 6:
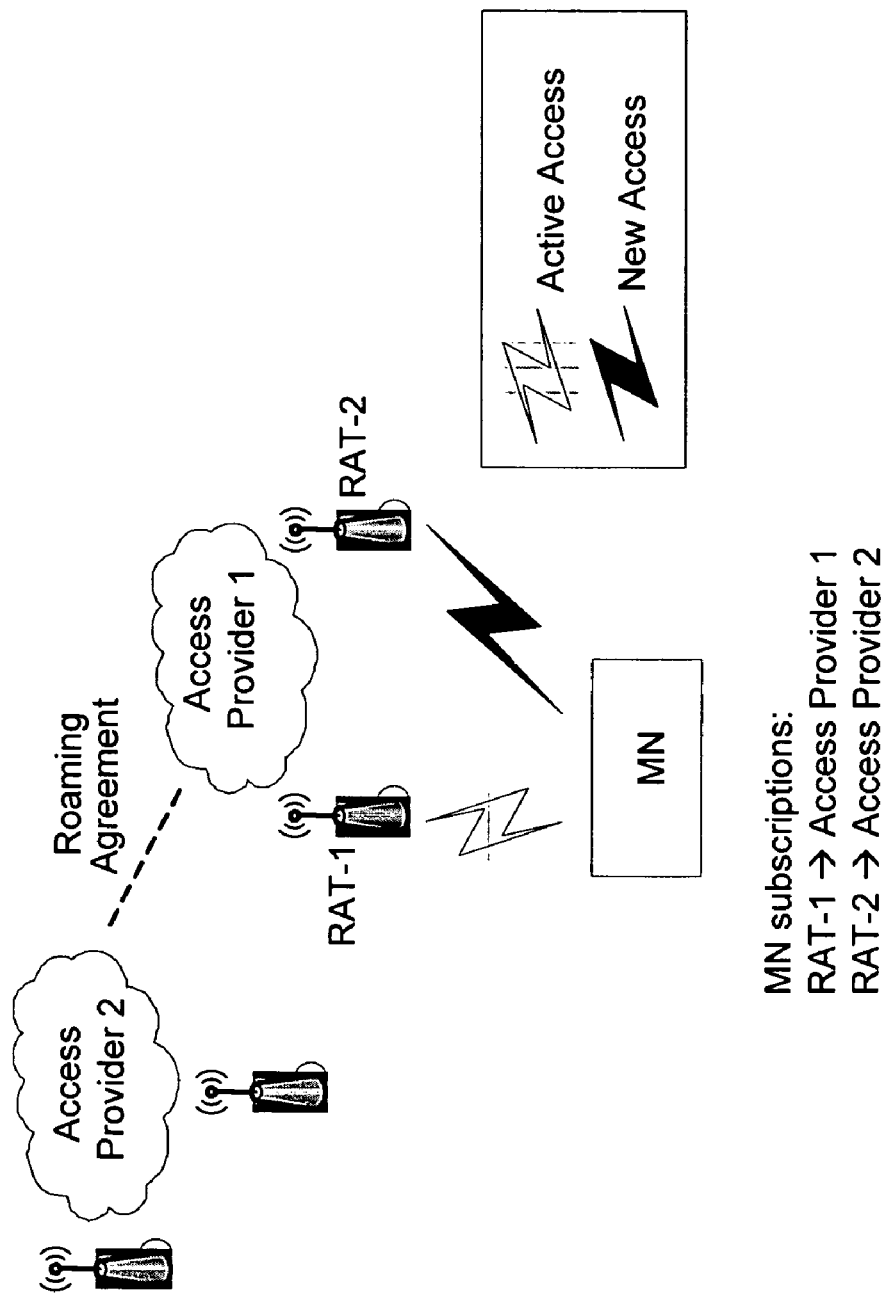
FIG. 6 shows a schematic diagram of a general network environment illustrating a multi-technology access.

FIG. 6 shows a schematic diagram of a general network environment illustrating a multi-technology access.

According to FIG. 6, a mobile node MN has a subscription for access technology RAT-1 from access provider 1 and correspondingly for access technology RAT-2 from access provider 2. When the mobile node MN is attached to the network of the access provider 1 via RAT-1, it can be said that the mobile node MN is in its home network. However, when the mobile node MN performs a handover from RAT-1 to RAT-2 without changing its local operator (i.e. access provider or access network), which is access provider 1, the MN is then in a visited network, if it is considered that home and visited networks are defined based on what network provides user's subscription data.

From the foregoing, it should be clear that visited network, home operator and respective terms are used above merely by way of example for the sake of simplifying the description of the present invention and its embodiments. Further, the relationship between the different terms used sometimes synonymously above should be made clear, such as e.g. visited network, access network, home operator, access provider, subscription provider, agreement broker etc. For example, it should be clear that a "visited network" can be a home network (of a specific access technology) or a subscription provider for one or several accesses (or access technologies).

According to a further embodiment of the present invention, the visited (operator core) network uses the pre-fetched (i.e. previously queried) subscription data relating to the different access technologies of the user to further optimize handover times both within the same RAT and between RATs.

In detail, when the mobile node MN makes a handover (cf. step 4) by changing its attachment point, an entity hosting a new attachment point needs to make a decision whether attachment is allowed or not. To be able to make this decision, the respective entity needs to authenticate the mobile node as indicated above. To this end, the visited network may "push" pre-fetched user's subscription information to the individual access networks so that it is closer to possible (radio) attachment points. This kind of distribution of necessary preparation (arrangement) information (subscription data) can be done in different ways as follows.

The processing of this embodiment could e.g. be RAT-specific; i.e. each supported RAT may either use this or not and, if used, different mechanisms/options as described below can be used.

As a first option, the subscription and/or state information is distributed to each node in the radio access networks, which provides an attachment point for providing access to the visited network.

As a second option, each radio access network has proxy elements located inside the respective access network, wherein the proxy elements each administer at least one network element providing an attachment point for providing access to the visited network. Then, the proxy elements provide (i.e. send) this information to the respective network elements providing the attachment points when it is queried.

As a third option, the radio access networks are divided into smaller network areas and the subscription and/or state information is distributed to a set of these network areas in a controlled manner. That is, measurement data provided by the mobile node over an existing connectivity is used to estimate that, if the mobile node makes a handover, which are the most probable network areas involved, and based on this estimation related network areas are updated.

In this case, either all nodes providing attachment points are updated, or each area may have proxies storing subscription and/or state information and providing it to other network area's nodes when requested to do so (see first and second options above).

In general, it is to be noted that the subscription and/or state information can optionally be distributed to all or only to selected access networks. Thus, it can be distributed in an access network specific manner, and these distribution techniques are independent of each other.

Although the principles of the present invention and its embodiments have been described above in terms of methods and procedural steps, the present invention also involves a respective system, a network arrangement and means for carrying out the above-described methods and procedural steps.

Figure 7:
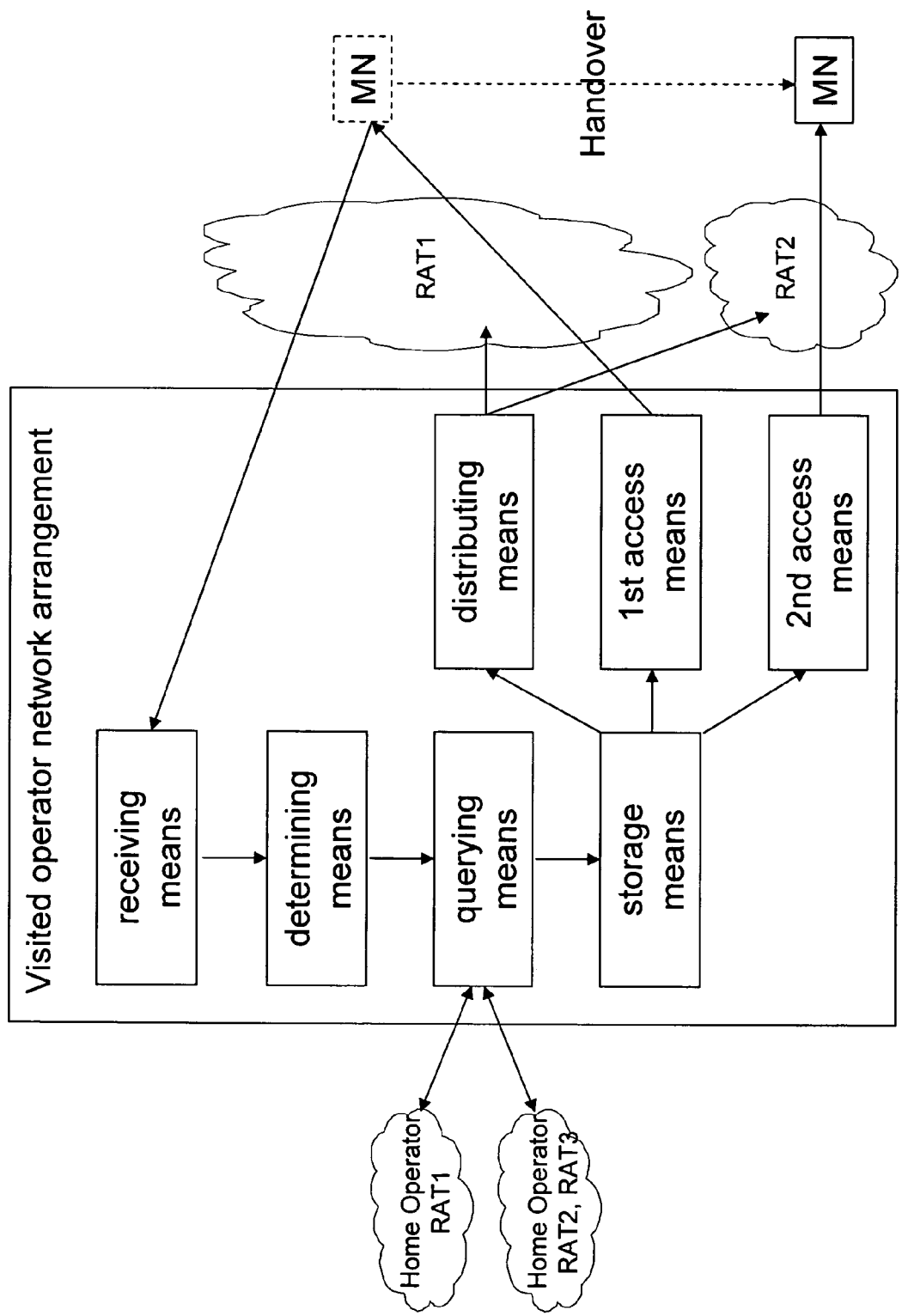
FIG. 7 shows a schematic block diagram of a system and a network arrangement according to an embodiment of the present invention.

In this connection, FIG. 7 shows a schematic block diagram of a system and a network arrangement according to an embodiment of the present invention. The depicted scenario essentially corresponds to that of FIG. 1 above.

The system according to the present embodiment of the present invention comprises at least two access networks operating according to different access technologies, at least one home operator network of the user, which handles respective subscriptions relating to the access technologies of the roaming node, and a network arrangement. The network arrangement as depicted in FIG. 7 represents the functionality of the visited network as described in connection with FIG. 1 above. The network arrangement according to the present embodiment is either a single network element of the visited network or a plurality of network elements thereof. The single means of the thus depicted network arrangement are configured to carry out the single functions and operations as described above in terms of methods and procedural steps, and they can be arranged within one or between several network elements in an appropriate way. Furthermore, it is to be noted that FIG. 7 only illustrates one exemplary configuration of the system and network arrangement of the present embodiments. Hence, particularly some of the depicted means can be omitted, as is specified in the appended claims.

Since the illustration of FIG. 7 should be self-explanatory for a skilled person, a rather rough description thereof is given below. The remainder of its overall disclosure is easily derivable from its observation.

The network arrangement is basically configured to prepare (arrange) the access networks other than the first one for providing access for the roaming node in case of a handover of the roaming node to one of these other access networks. The network arrangement exemplarily comprises receiving means for receiving an access request from a mobile node via an access network, e.g. the first access network RAT1. It further comprises determining means for determining the individual identities of the subscriptions by means of a standalone procedure between the roaming node and the visited network, or by means of a framework on the basis of a domain name system, DNS, lookup procedure, or by means of a framework on the basis of a 3G international mobile subscriber identity lookup procedure. A querying means is for querying first subscription data of said node relating to the first access technology and for querying subscription data of said node relating to the others of its access technologies, and storage means is for storing the queried subscription data. Further, the storage means is according to one embodiment further configured to maintain previously queried subscription data in case of a handover of the mobile node to another access network. Further, first access means is for providing access for said node via said first access network by means of said first subscription data, and second access means is for providing access for said node via said second access network by means of those of said previously queried subscription data which relate to the second access technology, e.g. after a handover of the roaming node from RAT1 to RAT2.

The querying means is configured to query the subscriptions of the roaming node from individual home operators managing the respective subscription, and/or the querying means is configured to query the subscriptions by means of at least one identity of said subscriptions. While querying, a different mechanism could be used for each subscription provider (e.g. home operator). This could also be the subject to an agreement like a roaming agreement (cf. FIGS. 5 and 6) between authorities (visited and subscription provider).

A distributing means is for distributing preparation (arrangement) information for preparing (arranging) the other access networks to these other access networks of the visited network, wherein the distributing means is configured to distribute the queried subscription data.

Thus, stated in general terms, the network arrangement, its constituent means and the system comprised of the network arrangement and other networks as well as the mobile node are configured to perform any of the methods for providing access for a roaming node to a visited communication network comprising multiple access networks as described throughout this description and/or the claims.

In general, it is also to be noted that the mentioned functional elements, e.g. querying means according to the present invention can be implemented by any known means, either in hardware and/or software, respectively, if it is only adapted to perform the described functions of the respective parts. For example, the querying means of the network arrangement can be implemented by any data processing unit, e.g. a microprocessor, being configured to query the respective subscription data as defined by the appended claims. The mentioned parts can also be realized in individual functional blocks or by individual devices, or one or more of the mentioned parts can be realized in a single functional block or by a single device. Correspondingly, the above illustration of FIG. 7 is only for illustrative purposes and does not restrict an implementation of the present invention in any way.

Figure 8:
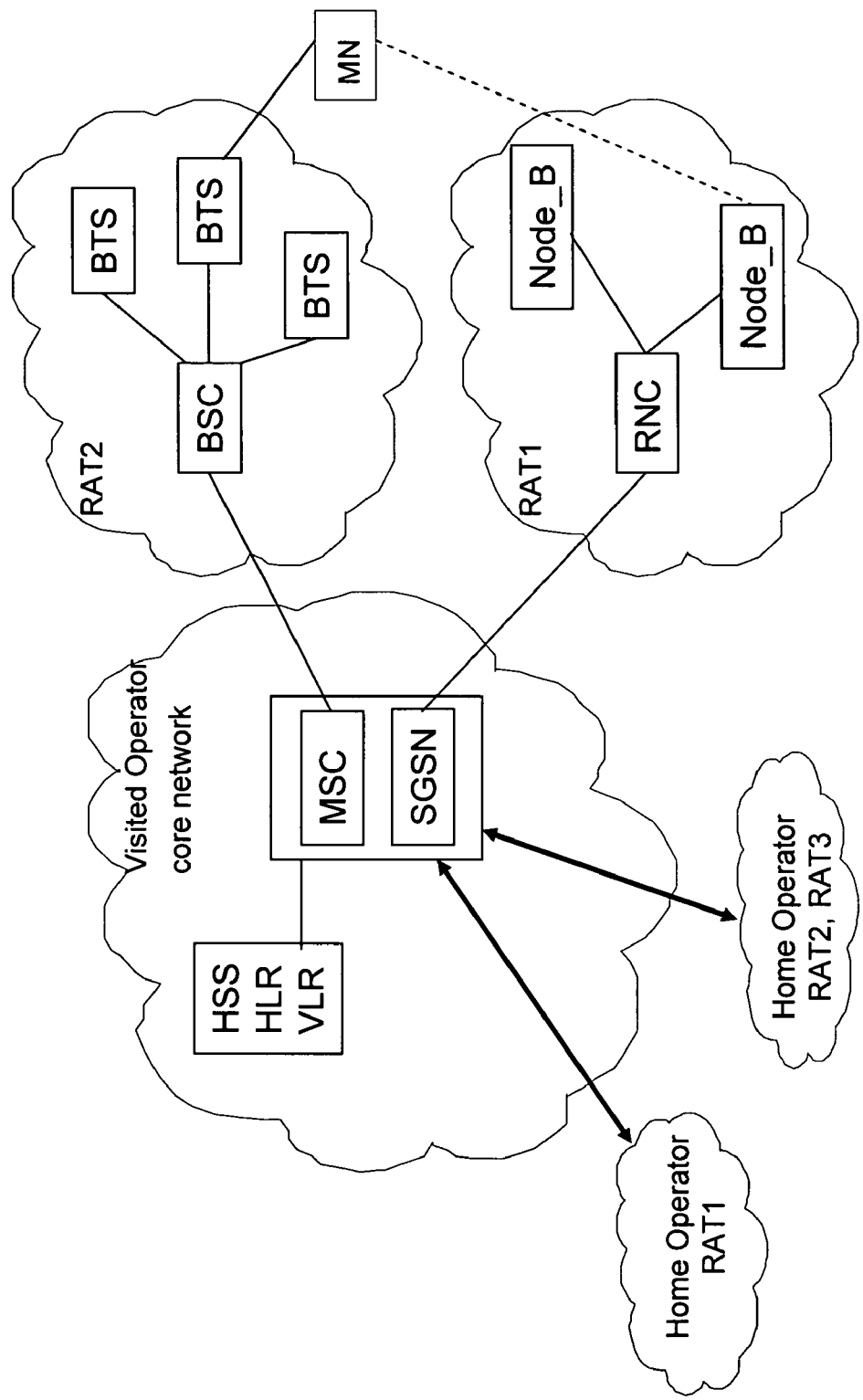
FIG. 8 shows a schematic diagram of a multi-access network environment illustrating network elements according to an embodiment of the present invention.

FIG. 8 shows a schematic diagram of a multi-access network environment illustrating network elements according to an embodiment of the present invention, thus being more detailed as compared with the similar illustration of FIG. 1.

According to the example as shown FIG. 8, a first access technology RAT1 is based on UMTS. Accordingly, access points of the respective access network are Node_B's and an access point controller is a radio network controller RNC. Further, a second access technology RAT2 is based on GSM/GPRS. Accordingly, access points of the respective access network are base transceiver stations BTS and an access point controller is a base station controller BSC. As an exemplary switching node in the visited operator core network, there is shown a network element comprising a serving GPRS support node, which relates to the first access technology, and a mobile switching center MSC, which relates to the second access technology. A block being denoted by HSS/HLR/VLR (HSS: home subscriber server, HLR: home location register, VLR: visitor location register) represents an exemplary storage means of the core network.

However, it is to be noted that the number and kind of network elements shown in FIG. 8 is only intended as an example and does not limit the applicability and/or conceivable implementation of the present invention in any way. Also, the mapping of above-described functionalities to network elements and/or network parts is by no way restricted by the exemplary illustration of FIG. 8, which is merely intended to serve as assistance for the understanding of the above-described embodiments of the present invention.

Furthermore, method steps likely to be implemented as software code portions and being run using a processor at one of the peer entities are software code independent and can be specified using any known or future developed programming language such as e.g. C, C++, and Assembler. Method steps and/or devices or means likely to be implemented as hardware components at one of the peer entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

In summary and stated in more general terms, one facet of the embodiments of the present invention is a usage of a knowledge of an active (radio) access of a roaming user to trigger a query to the user's other home networks or subscription providers in order to transfer required arrangement data to the currently visited network, such as for example radio access technology (RAT) specific data. Another facet of the embodiments of the present invention, which is directly linked with the above facet, is a distribution of this transferred user information (i.e. subscription data) to different access networks.

It is also to be noted that it is irrelevant for the present invention as to what mechanisms are used to transfer user's additional RAT-specific subscription IDs to the visited network, what mechanisms are used to distribute user's subscription and/or state information to local access networks, how access network division is done and how proxy elements are implemented. The principles of the present invention and its embodiments are applicable to any conventionally known mechanism or technique for realizing these functions.

Accordingly, there are presented measures for providing access for a mobile node to a communication network comprising multiple access networks operating according to different access technologies, wherein said communication network is configured to communicate by means of different access technologies with said mobile node, comprising, upon an access request of the mobile node at a first access network, preparing the access networks other than the first one for providing access for the mobile node in case of a handover of the mobile node to one of these other access networks.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

The invention claimed is:

1. A method comprising:
providing access for a mobile node configured to communicate by different access technologies to a communication network comprising multiple access networks operating according to different access technologies, and
upon an access request of the mobile node at a first access network authenticating the mobile node,
irrespective of whether the mobile node is authenticated and whether the access request is granted, fetching preparation information related to the mobile node, and
preparing the access networks other than the first access network to provide access for the mobile node in case of a handover of the mobile node to one of the other access networks, comprising distributing to these other access networks of the communication network the preparation information to prepare the other access networks, wherein the distributing is effected on the basis of smaller network areas into which the access networks are divided on the basis of current connectivity conditions, and wherein the distributing the preparation information is performed to a set of most probable network areas of the smaller network areas for a handover.

2. The method according to claim 1, wherein said communication network comprises subscription information relating to different access technologies supported by said mobile node, wherein the fetching comprises querying the subscription information, and wherein preparing the other access networks is based on the information.

3. The method according to claim 2, wherein the subscriptions of the mobile node are handled by individual operators each of which manages at least one subscription relating to at least one access technology.

4. The method according to claim 2, wherein said subscriptions are associated with at least one identity.

5. The method according to claim 2, wherein upon the access request of the mobile node at the first access network operating according to a first access technology, further comprising:
  querying first subscription data of said node relating to the first access technology;
  querying subscription data of said node relating to the others of its access technologies; and
  providing access for said node via said first access network by said first subscription data.

6. The method according to claim 5, wherein upon a handover of said node to a second access network operating according to a second access technology, further comprising:
  providing access for said node via said second access network by those of said previously queried subscription data which relate to the second access technology.

7. The method according to claim 5, wherein the subscriptions of the mobile node are queried from the individual operators managing the respective subscription.

8. The method according to claim 5, further comprising maintaining previously queried subscription data at a respective access network in case of a handover of the mobile node to another access network.

9. The method according to claim 5, wherein the querying of subscriptions is conducted by at least one identity of said subscriptions.

10. The method according to claim 9, wherein the access request contains a generic identity with which every one of the subscriptions is associated.

11. The method according to claim 9, further comprising:
  determining the individual identities of said subscriptions by a standalone procedure between the mobile node and the network.

12. The method according to claim 9, further comprising:
  determining the individual identities of said subscriptions by a framework on the basis of a domain name system lookup procedure.

13. The method according to claim 9, further comprising:
  determining the individual identities of said subscriptions by a framework on the basis of a third generation international mobile subscriber identity lookup procedure.

14. The method according to claim 1, wherein the preparation information is the queried subscription data.

15. The method according to claim 1, wherein said distributing comprises a distribution to each network element in the access networks, which provides an attachment point to provide access to the network.

16. The method according to claim 1, wherein said distributing comprises a distribution to proxy elements in the access networks, which administer at least one network element providing an attachment point to provide access to the network.

17. The method according to claim 16, further comprising sending said information from a proxy element to a network element providing an attachment point in case of a handover of the mobile node to the respective access network.

18. The method according to claim 1, wherein the distribution is effected to each network element providing an attachment point, which is located in a predetermined set of at least one network area.

19. The method according to claim 1, wherein the distribution is effected to a proxy element administering at least one network element providing an attachment point, which is located in a predetermined set of at least one network area.

20. The method according to claim 1, wherein the mobile node is roaming in the communication network, the communication network acting as a visited network.

21. A computer program product, embodied on a non-transitory computer readable medium, being loadable into a memory of a digital processor of a network element in a communication network and comprising software code portions for performing, when said product is run on said digital processor, the method according to claim 1.

22. An apparatus comprising:
  an access element configured to provide access for a mobile node to a communication network, said communication network comprising multiple access networks operating according to different access technologies, wherein the apparatus is configured to communicate with said mobile node by a first access technology of a first access network,
  a processor configured upon receipt of an access request of the mobile node at a first access network to authenticate the mobile node,
  the processor configured, irrespective of whether the mobile node is authenticated and whether the access request is granted, to fetch preparation information related to the mobile node,
  the processor configured to prepare the access networks, other than the first one, to provide access for the mobile node in case of a handover of the mobile node to one of these other access networks, and
  a transmitter configured to distribute to these other access networks of the network the preparation information to prepare the other access networks, wherein the transmitter is configured to distribute the preparation information on the basis of smaller network areas into which the access networks are divided on the basis of current connectivity conditions, and wherein the transmitter is configured to distribute the preparation information to a set of most probable network areas of the smaller network areas for a handover.

23. The apparatus according to claim 22, wherein fetching comprises the processor is configured to at least one of query first subscription data relating to the first access technology and query subscription data relating to the others of its access technologies.

24. The apparatus according to claim 22, wherein the processor is configured to perform the preparing of the other access networks based on subscriptions relating to different access technologies.

25. The apparatus according to claim 24, wherein fetching comprises the processor is configured to query the subscriptions from individual operators managing the respective subscriptions.

26. The apparatus according to claim 24, wherein the processor is configured to query the subscriptions by at least one identity of said subscriptions.

27. The apparatus according to claim 26, wherein the processor is configured to determine the individual identities of said subscriptions by means of a standalone procedure between the node and the network.

28. The apparatus according to claim 26, wherein the processor is configured to determine the individual identities of said subscriptions by means of a framework on the basis of a domain name system lookup procedure.

29. The apparatus according to claim 26, wherein the processor is configured to determine the individual identities of said subscriptions by a framework on the basis of a third generation international mobile subscriber identity lookup procedure.

30. The apparatus according to claim 22, further comprising memory configured to store queried subscription data.

31. The apparatus according to claim 30, wherein the memory is further configured to maintain previously queried subscription data in case of a handover of the mobile node to another access network.

32. The apparatus according to claim 22, wherein the apparatus is part of the first access network of a communication network.

33. The apparatus according to claim 22, wherein the apparatus is a switching network element of a communication network.

34. The apparatus according to claim 33, wherein the switching network element is a mobile switching center.

35. The apparatus according to claim 33, wherein the switching network element is a serving general packet radio service support node.

36. The apparatus according to claim 22, wherein the apparatus is a home subscriber server.

37. An apparatus comprising:
an access element configured to provide access for a mobile node to a communication network, said communication network comprising multiple access networks operating according to different access technologies, wherein the apparatus is configured to communicate with said mobile node by an access technology other than that of the first access network, and a processor configured, upon receipt of an access request of the mobile node at a first access network, to authenticate the mobile node,
the processor configured, irrespective of whether the mobile node is authenticated and whether the access request is granted, to fetch preparation information related to the mobile node,
the processor configured to prepare the access networks, other than the first one, to provide access for the mobile node in case of a handover of the mobile node to one of these other access networks, and
a transmitter configured to distribute to these other access networks of the network the preparation information to prepare the other access networks, wherein the transmitter is configured to distribute on a basis of smaller network areas into which the access networks are divided on a basis of current connectivity conditions, and wherein the transmitter is configured to distribute the preparation information to a set of most probable network areas of the smaller network areas for a handover.

38. The apparatus according to claim 37, wherein the processor is configured to perform the preparing of the other access networks based on subscriptions relating to different access technologies.

39. The apparatus according to claim 37, wherein the fetching comprises querying subscription data relating to the access technology other than that of the first access network, and further comprising:
a receiver configured to receive the queried subscription data.

40. The apparatus according to claim 39, further comprising:
memory configured to store the received subscription data.

41. The apparatus according to claim 40, wherein the memory is further configured to maintain previously queried subscription data in case of a handover of the mobile node to another access network.

42. The apparatus according to claim 39, wherein the processor is configured to provide access for said node via another access network than the first one by the previously queried subscription data.

43. The apparatus according to claim 37, wherein said subscriptions are associated with at least one identity.

44. The apparatus according to claim 43, wherein the processor is configured to determine the individual identities of said subscriptions.

45. The apparatus according to claim 37, wherein the transmitter is configured to distribute queried subscription data.

46. The apparatus according to claim 37, wherein the apparatus is part of an access network of the communication network.

47. The apparatus according to claim 46, wherein the apparatus is an access point.

48. The apparatus according to claim 46, wherein the apparatus is an access point controller configured to control at least one access point.

49. The apparatus according to claim 37, wherein the apparatus is a switching network element.

50. A network comprising:
a network arrangement of a communication network to provide access for a mobile node to the communication network comprising multiple access networks operating according to different access technologies, wherein said network arrangement is configured to:
communicate with said mobile node by different access technologies, and upon receipt of an access request of the mobile node at a first access network to authenticate the mobile node,
irrespective of whether the mobile node is authenticated and whether the access request is granted, to fetch preparation information related to the mobile node, to prepare the access networks other than the first access network to provide access for the mobile node in case of a handover of the mobile node to one of these other access networks, and
the network arrangement further configured to distribute to the other access networks of the network the preparation information to prepare the other access networks, wherein the distributing is effected on a basis of smaller network areas into which the access networks are divided on a basis of current connectivity conditions, and wherein the distributing the preparation information is performed to a set of most probable network areas of the smaller network areas for a handover.

51. The network according to claim 50, wherein the communication network comprises subscription information relating to different access technologies supported by said mobile node, wherein the fetching comprises querying the subscription information, and wherein preparing the other access networks is based on the subscription information.

52. The network according to claim 50, wherein the access networks are access providers, and wherein the access networks of the communication network have a roaming agreement with each other.

53. The network according to claim 52, further comprising an agreement broker configured to manage roaming agreements.

54. The network according to claim 50, wherein the preparing of the other access networks is based on subscriptions relating to the different access technologies.

55. The network according to claim 54, wherein the network element is configured to query first subscription data relating to the first access technology, and to query subscription data relating to the others of its access technologies, and to provide access for said node via said first access network by means of said first subscription data.

56. The network according to claim 55, wherein the network element is configured to provide access for said node via said second access network by those of said previously queried subscription data which relate to the second access technology.

57. The network according to claim 55, wherein the network element is configured to query the subscriptions from individual operators managing the respective subscriptions.

58. The network according to claim 57, wherein the operators are subscription providers.

59. The network according to claim 55, wherein the network element is configured to query the subscriptions by at least one identity of said subscriptions.

60. The network according to claim 59, wherein the network element is configured to determine the individual identities of said subscriptions by a standalone procedure between the node and the network.

61. The network according to claim 59, wherein the network element is configured to determine the individual identities of said subscriptions by a framework on the basis of a domain name system lookup procedure.

62. The network according to claim 59, wherein the network element is configured to determine the individual identities of said subscriptions by a framework on the basis of a third generation international mobile subscriber identity lookup procedure.

63. The network according to claim 50, wherein the network element is configured to distribute preparation information to prepare the other access networks to these other access networks of the network.

64. The network according to claim 63, wherein the network element is configured to distribute the queried subscription data.

65. The network according to claim 50, wherein the network element is configured to store queried subscription data.

66. The network according to claim 65, wherein the network element is further configured to maintain previously queried subscription data in case of a handover of the mobile node to another access network.

67. The network according to claim 65, wherein the network element comprises a home subscriber server.

68. The network according to claim 65, wherein the network element comprises at least one of a home location register and a visitor location register.

* * * * *